United States Patent
Vignali

(10) Patent No.: US 12,410,949 B2
(45) Date of Patent: Sep. 9, 2025

(54) RAM AIR TURBINE POWERED CABIN AIR COMPRESSOR

(71) Applicant: Hamilton Sundstrand Corporation, Charlotte, NC (US)

(72) Inventor: Mark G. Vignali, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 314 days.

(21) Appl. No.: 17/841,282

(22) Filed: Jun. 15, 2022

(65) Prior Publication Data

US 2023/0408153 A1    Dec. 21, 2023

(51) Int. Cl.
*F25B 9/06* (2006.01)
*B64D 13/06* (2006.01)
*F25B 9/00* (2006.01)

(52) U.S. Cl.
CPC ............ *F25B 9/06* (2013.01); *B64D 13/06* (2013.01); *F25B 9/004* (2013.01); *B64D 2013/0618* (2013.01); *B64D 2013/0644* (2013.01)

(58) Field of Classification Search
CPC ..................................... B64D 13/06
See application file for complete search history.

(56) References Cited

U.S. PATENT DOCUMENTS

| | | | |
|---|---|---|---|
| 2,767,561 A | 10/1956 | Seeger | |
| 2,958,211 A | 11/1960 | Arnold | |
| 4,523,517 A * | 6/1985 | Cronin | B64D 13/06 237/2 A |
| 4,934,154 A * | 6/1990 | Altoz | G11C 5/00 62/197 |
| 5,056,335 A | 10/1991 | Renninger et al. | |
| 5,967,461 A | 10/1999 | Farrington | |
| 7,624,592 B2 | 12/2009 | Lui et al. | |
| 9,669,936 B1 * | 6/2017 | Fiterman | B64D 13/06 |
| 10,155,592 B2 * | 12/2018 | McAuliffe | F02C 6/08 |
| 10,752,375 B2 | 8/2020 | Snyder | |
| 2017/0341760 A1 | 11/2017 | Hall et al. | |

OTHER PUBLICATIONS

Extended European Search Report for European Application No. 23179340.7; Report Mail Date Oct. 20, 2023 (9 Pages).

* cited by examiner

*Primary Examiner* — Christopher R Zerphey
(74) *Attorney, Agent, or Firm* — CANTOR COLBURN LLP

(57) ABSTRACT

A pressurization system for a vehicle includes an inlet for receiving a medium and a cabin air compressing device arranged in fluid communication with the inlet. The cabin air compressing device includes a shaft, a compressor connected to the shaft, a motor operably connected to the shaft and configured to drive the compressor, and a turbine connected to the shaft and also configured to drive the compressor upon receipt of the medium. A heat exchanger has a first inlet fluidly connected to the compressor outlet and a second inlet fluidly connected to the turbine outlet. The compressor inlet and the turbine inlet are fluidly connected to and are arranged in parallel relative to the inlet.

17 Claims, 2 Drawing Sheets

RAM AIR TURBINE POWERED CABIN AIR COMPRESSOR

BACKGROUND

Exemplary embodiments pertain to the art of thermal management of and, in particular, to thermal management of one or more loads of a vehicle.

A typical commercial aircraft includes at least several nonintegrated pressurization systems configured to provide temperature control to various regions of the aircraft. For example, an aircraft environmental control system primarily provides heating and cooling for the aircraft cabin area. In addition, a galley chiller system is dedicated to refrigerating the food carts in the galleys located throughout the aircraft. Since each system has a significant weight and power requirement, the overall efficiency of the aircraft is affected by these nonintegrated systems.

One or more of these pressurization systems may rely on ram or fresh air to condition, i.e., to cool or heat another medium. However, in applications where the aircraft is travelling at supersonic speeds, the temperature of the ram air may be too high to effectively remove heat from another load.

BRIEF DESCRIPTION

According to an embodiment, a pressurization system for a vehicle includes an inlet for receiving a medium and a cabin air compressing device arranged in fluid communication with the inlet. The cabin air compressing device includes a shaft, a compressor connected to the shaft, a motor operably connected to the shaft and configured to drive the compressor, and a turbine connected to the shaft and also configured to drive the compressor upon receipt of the medium. A heat exchanger has a first inlet fluidly connected to the compressor outlet and a second inlet fluidly connected to the turbine outlet. The compressor inlet and the turbine inlet are fluidly connected to and are arranged in parallel relative to the inlet.

In addition to one or more of the features described herein, or as an alternative, in further embodiments the medium is ram air.

In addition to one or more of the features described herein, or as an alternative, in further embodiments an expanded medium is provided at the turbine outlet and a compressed medium is provided at the compressor outlet, and within the heat exchanger, heat is configured to transfer from the compressed medium to the expanded medium.

In addition to one or more of the features described herein, or as an alternative, in further embodiments the compressed medium at an outlet of the heat exchanger is provided to at least one component configured to further condition the compressed medium.

In addition to one or more of the features described herein, or as an alternative, in further embodiments the at least one component configured to further condition the compressed medium further comprises a load heat exchanger.

In addition to one or more of the features described herein, or as an alternative, in further embodiments the expanded medium provided at an outlet of the heat exchanger is exhausted overboard.

In addition to one or more of the features described herein, or as an alternative, in further embodiments the expanded medium at the outlet of the heat exchanger is provided to another cooling heat exchanger.

In addition to one or more of the features described herein, or as an alternative, in further embodiments comprising a bypass conduit connecting the inlet and the second inlet of the heat exchanger and a valve associated with the bypass conduit.

In addition to one or more of the features described herein, or as an alternative, in further embodiments the vehicle is an aircraft.

According to an embodiment, a method of conditioning a load of a vehicle includes compressing a first portion of a medium provided from an inlet within a compressor to create a compressed medium that is output at a compressor outlet, expanding a second portion of the medium provided from the inlet within a turbine to create an expanded medium and cooling the compressed medium within a cooling heat exchanger connected to the compressor outlet via a cooling medium. Compressing the first portion of the medium and expanding the second portion of the medium occur simultaneously.

In addition to one or more of the features described herein, or as an alternative, in further embodiments the expanded medium output from the turbine is provided to the cooling heat exchanger as the cooling medium.

In addition to one or more of the features described herein, or as an alternative, in further embodiments in a first mode, the compressor is driven in response to expanding the second portion of the medium within the turbine, and in a second mode, the compressor is driven by an electric motor and in response to expanding the second portion of the medium within the turbine.

In addition to one or more of the features described herein, or as an alternative, in further embodiments exhausting the cooling medium from the cooling heat exchanger overboard.

In addition to one or more of the features described herein, or as an alternative, in further embodiments providing the cooling medium from the cooling heat exchanger to another cooling heat exchanger.

In addition to one or more of the features described herein, or as an alternative, in further embodiments delivering the compressed medium provided at an outlet of the cooling heat exchanger to at least one component configured to further condition the compressed medium.

In addition to one or more of the features described herein, or as an alternative, in further embodiments further cooling the expanded medium within a load heat exchanger via another cooling medium.

In addition to one or more of the features described herein, or as an alternative, in further embodiments opening a valve arranged within a bypass conduit such that at least some of the second portion of the medium provided from the inlet bypasses the turbine.

In addition to one or more of the features described herein, or as an alternative, in further embodiments the medium is ram air.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
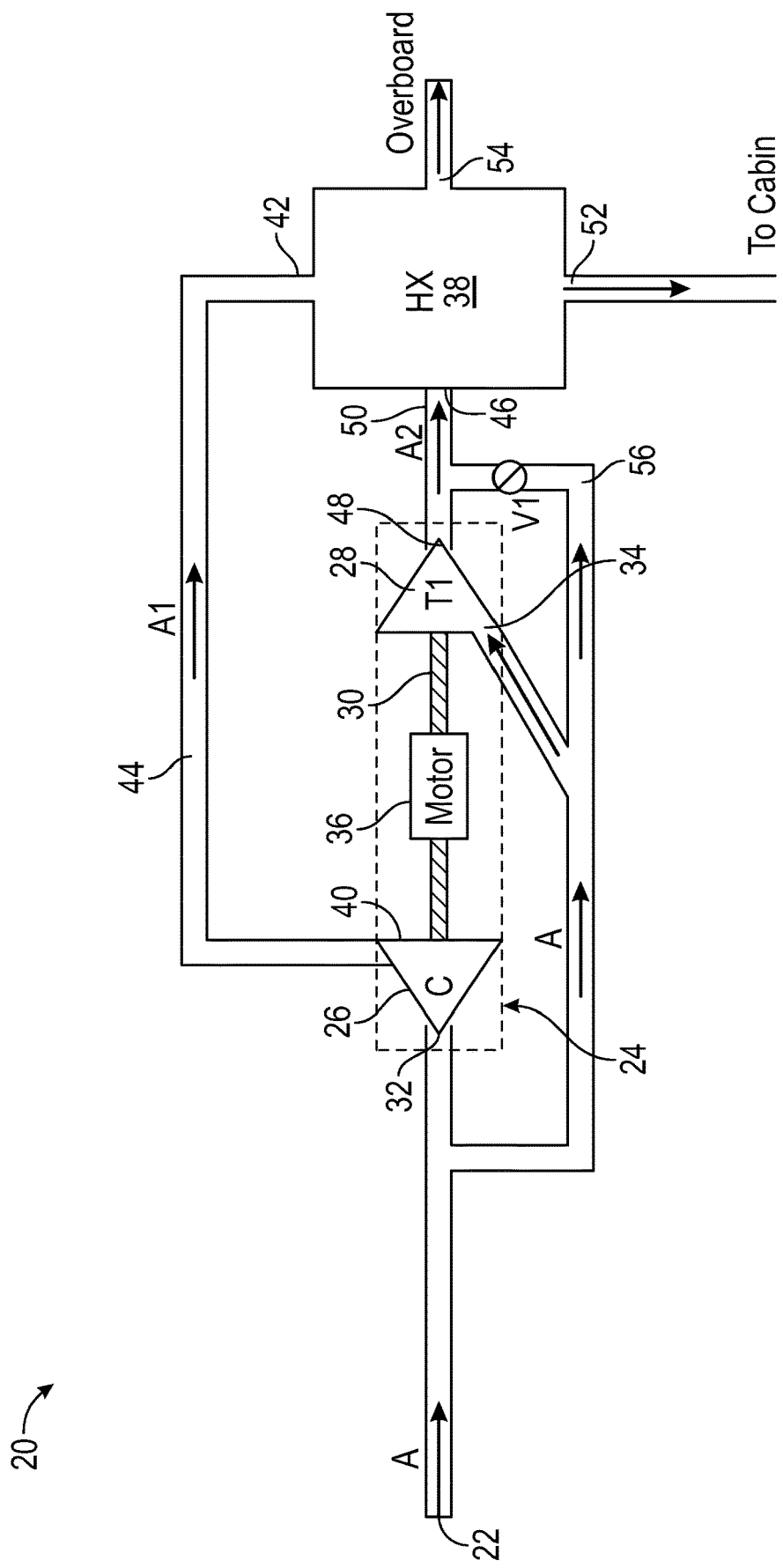
FIG. 1 is a schematic diagram of a portion of a pressurization system of a vehicle according to an embodiment.

With reference now to FIG. 1, a schematic diagram of a portion of a pressurization system 20 is illustrated. The pressurization system 20 may be a refrigeration or air cycle subsystem and is configured to receive a medium A at an inlet 22. In the illustrated, non-limiting embodiment, the medium is fresh air, such as outside air for example. This outside air, also referred to herein as RAM air, can be procured via one or more scooping mechanisms, such as an impact scoop or a flush scoop for example. When the pressurization system 20 is implemented on an aircraft, the medium A is generally at an ambient pressure equal to an air pressure outside of the aircraft when the aircraft is on the ground and is between an ambient pressure and a cabin pressure when the aircraft is in flight. It should be understood that any suitable medium A is within the scope of the disclosure. For example, other suitable mediums available on an aircraft include, but are not limited to bleed air, which is pressurized air originating from, i.e., being "bled" from, an engine or auxiliary power unit of the aircraft, or cabin discharge air, which is air leaving the cabin and that would typically be discharged overboard.

It should be understood that the elements of the pressurization system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the pressurization system 20 can be regulated to a desired value.

In the illustrated, non-limiting embodiment, the pressurization system includes at least one cabin air compressing device 24. The cabin air compressing device 24 is a mechanical device that includes one or more components for performing thermodynamic work on a medium (e.g., extracts work from the medium by raising and/or lowering the pressure thereof and by raising and/or lowering the temperature thereof).

In the illustrated, non-limiting embodiment, the cabin air compressing device 24 includes a compressor 26 and a turbine 28 operably coupled by a shaft 30. Accordingly, the cabin air compressing device 24 may also be referred to herein as a turboCAC. A compressor 26 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. A turbine 28 is a mechanical device that expands a medium and extracts work therefrom (also referred to as extracting energy) to drive the compressor 26 via the shaft 30. Although only a two-wheel cabin air compressing device 24 is illustrated and described herein, it should be understood that embodiments having additional wheels, such as an additional compressor, turbine, and/or fan for example, are also within the scope of the disclosure.

In the illustrated, non-limiting embodiment, an inlet 32 of the compressor 26 and an inlet 34 of the turbine 28 are both fluidly connected to the inlet 22. Accordingly, a first portion of the flow of medium A from the inlet 22 may be provided to the compressor inlet 32 and a second portion of the flow of medium A from the inlet 22 may be provided to the turbine inlet 34 in parallel.

In an embodiment, the cabin air compressing device 24 additionally includes an electric motor 36 connected to the shaft 30 and operable to drive the compressor 26. The motor 36 can receive power from a power source (not shown) such as generator or a power bus (e.g., a power bus of an aircraft). In embodiments including both a turbine 28 and a motor 36 connected to the shaft 30, either or all of the turbine 28 and the motor 36 may be used to drive the compressor 26.

The pressurization system 20 includes at least one cooling heat exchanger 38 arranged downstream from at least one of the compressor 26 and the turbine 28 relative to a flow of medium through the pressurization system 20. In the illustrated, non-limiting embodiment, the cooling heat exchanger 38 is configured to receive and cool a flow of compressed medium output from the compressor 26. As shown, an outlet 40 of the compressor 26 is connected to a first or heated flow inlet 42 of the heat exchanger via a conduit 44. The compressed medium A1 is cooled within the heat exchanger 38 by a cooling medium provided at a second or cooling flow inlet 46. In the illustrated, non-limiting embodiment, the cooling medium is the expanded medium A2 provided at the outlet 48 of the turbine 28, the outlet 48 being connected to the cooling flow inlet 46 via a conduit 50. Although the heat exchanger 38 is illustrated in FIG. 1 as a cross-flow heat exchanger, a skilled artisan will realize that the heat exchanger 38 can be any suitable type of heat exchanger that achieves the desired result of cooling the compressed medium A1.

The cooling heat exchanger 38 additionally includes a first or heated flow outlet 52 and a second or cooling flow outlet 54. In an embodiment, the first heated flow outlet 52 of the heat exchanger 38 is fluidly coupled to a volume of the vehicle, such as a cabin for example. The first heated flow outlet 52 may be directly connected to a volume, such as via a conduit, or alternatively, the flow at the first heated flow outlet 52 may be provided to at least one component, such as of an environmental control system (ECS), operable to condition the compressed medium A1 for example, before it is delivered to the volume. The heated expanded medium A2 provided at the second cooling flow outlet 54 is exhausted overboard to the ambient atmosphere surrounding the vehicle. In an embodiment, the expanded medium A2 may be exhausted overboard directly from the second cooling flow outlet 54, or may be provided to one or more other components before ultimately being exhausted overboard.

During operation of the pressurization system 20 in a first mode when the vehicle is at a high altitude, such as during a supersonic cruise condition for example, a first portion of the medium A provided at the inlet 22 is provided generally directly to the inlet 32 of the compressor 26. The act of compressing the medium A, heats the medium A and increases the pressure of the medium A. At the same time, a second portion of the flow of medium A from the inlet 22 is provided to the inlet 34 of the turbine 28. Within the turbine 28, the medium A is expanded and work is extracted therefrom. The work extracted from the medium A within the turbine 28 is used to drive the compressor 26. However, it should be understood that embodiments where the aircraft is not flying in a supersonic condition, the motor 36 may be used in combination with the energy extracted at the turbine to drive the compressor 26. The expanded medium A2 output from the turbine 28 has a reduced temperature and pressure relative to the medium A provided to the inlet 34 of the turbine 28.

The compressed medium A1 output from the outlet 40 of the compressor 26, represented as A1, may then flow to the heated flow inlet 42 of the cooling heat exchanger 38. Similarly, the expanded medium output from the turbine 28, represented as A2, may then flow to the cooling flow inlet 46 of the cooling heat exchanger 38. Within the cooling heat exchanger 38, heat from the compressed medium A1 is transferred to the cooling medium A2, before the cooling medium A2 is exhausted overboard, such as via the second cooling flow outlet 54 for example, into the ambient atmosphere adjacent to the vehicle. As previously described, the compressed medium A1 provided at the heated flow outlet 52 of the cooling heat exchanger 38 is then provided to the volume or to one or more other components arranged upstream from the volume and configured to further condition the compressed medium A1.

A second mode of operation of the pressurization system 20 is substantially similar to the first mode of operation. However, in the second mode, a valve V1 arranged within a bypass conduit 56 is opened such that at least some, and in some embodiments all of the second portion of the flow A bypasses the turbine 28 via the bypass conduit 56. In such embodiments, the cooling medium provided to the second cooling flow inlet 46 of the cooling heat exchanger 38 is either the medium A or a combination of the expanded medium A2 and the medium A.

Figure 2:
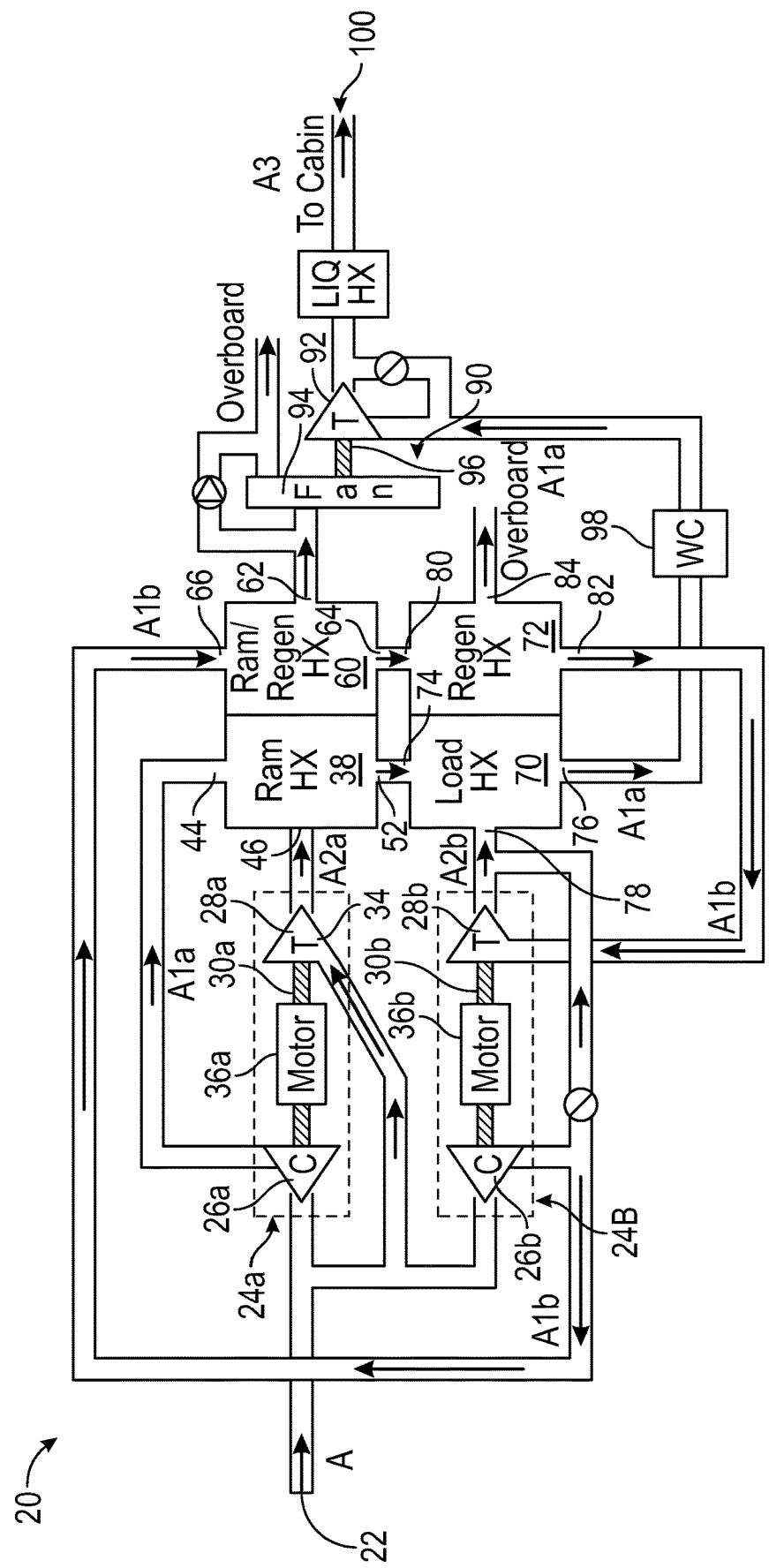
FIG. 2 is a schematic diagram of a pressurization system of a vehicle according to an embodiment.

With reference now to FIG. 2, an example of a pressurization system 20 is provided. In the illustrated, non-limiting embodiment, the pressurization system 20 includes a first cabin air compressing device 24a and a second cabin air compressing device 24b, each of which includes a compressor 26a, 26b, turbine 28a, 28b, and motor 36a, 36b operably coupled to a shaft 30a, 30b as previously described. The first compressor 26a and the first turbine 28a are arranged in parallel relative to the inlet 22 as previously described. In addition, the second cabin air compressing device 24b is arranged in parallel with a portion of the first cabin air compressing device 24a. In the illustrated, non-limiting embodiment, the second compressor 26b is arranged in parallel with the first compressor 26a and the first turbine 28a relative to a flow of medium A provided at the inlet 22. Further, in an embodiment, the medium A provided at the inlet 22 is configured to flow through compressor 26b and the turbine 28b of the second cabin air compressing device 24b in series, as will be described in more detail below.

In the non-limiting embodiment of FIG. 2, the at least one cooling heat exchanger includes both a first cooling heat exchanger 38 and another cooling heat exchanger or second cooling heat exchanger 60 (also referred to herein as an outflow or regeneration heat exchanger). In the illustrated, non-limiting embodiment, these cooling heat exchangers 38, 60 are co-located; however, this is not required. In one embodiment, the cooling heat exchangers 38, 60 are contained in a single unit. For simplicity, in FIG. 2, the connection that provides the transfer of the cooling medium from the first cooling heat exchanger 38 to the second heat exchanger 60 is not shown. As such, the unit comprising the first cooling heat exchanger 38 and the second cooling heat exchanger 60 includes a cooling medium inlet 46 at the first cooling heat exchanger 38 and cooling medium outlet 62 that is part of second cooling heat exchanger 60. Although not shown, the first cooling heat exchanger 38 may include a cooling medium outlet (not shown) that provides the flow of cooling medium directly (or indirectly) to a cooling flow inlet (not shown) of the second cooling heat exchanger 60. It shall be understood that the input/output need not be a physical object and can be formed such that the path from the heated flow inlet 46 to the outlet 62 is a continuous path.

In the illustrated, non-limiting embodiment, the pressurization system 20 additionally includes at least one heat exchanger arranged downstream from one or more components of the second cabin air compression device 24b. In the non-limiting embodiment of FIGS. 1 and 2, the at least one heat exchanger includes a first heat exchanger 70, also referred to herein as a load heat exchanger, and a second heat exchanger 72. These heat exchangers 70, 72 may, but need not be contained in a single unit. The first heat exchanger 70 includes a first inlet 74 and a first outlet 76 arranged along a flow path and the second heat exchanger 72 similarly includes a first inlet 80 and a first outlet 82 arranged along a flow path. As shown, the first inlet 74 of the first heat exchanger 70 may be fluidly connected, directly or indirectly, to the heated flow outlet 52 of the first cooling heat exchanger 38. Alternatively, or in addition, the first inlet 80 of the second heat exchanger 72 may be fluidly connected directly, or indirectly, to a first or heated flow outlet 64 of the second cooling heat exchanger 60.

The unit comprising the first heat exchanger 70 and the second heat exchanger 72 includes a second or cooling medium inlet 78 at the first heat exchanger 70 and second or cooling medium outlet 84 that is part of second heat exchanger 72. Although not shown, the first heat exchanger 70 may include a cooling medium outlet (not shown) that provides the flow of cooling medium directly (or indirectly) to a cooling flow inlet (not shown) of the second heat exchanger 72 to define a secondary cooling flow path through the heat exchangers 70, 72. It shall be understood that the input/output need not be a physical object and can be formed such that the path from the second cooling medium inlet 78 to the second cooling medium outlet 84 is a continuous path.

Another cooling medium, also referred to herein as a second cooling medium, is provided to the cooling flow path extending through between the second cooling medium inlet 78 to the second cooling medium outlet 84 of the heat exchangers 70, 72. In the illustrated, non-limiting embodiment, the compressed medium output from the compressors 24a and 24b are cooled within the first heat exchanger 70 and the second heat exchanger 72, respectively, is cooled by a second cooling medium A2b provided at second cooling medium inlet 78. In the illustrated, non-limiting embodiment, the second cooling medium is expanded medium output from the outlet of the turbine 28b of the second cabin air compression device 24b. Although the first and second cooling mediums are illustrated and described herein as being exhausted overboard to the ambient atmosphere surrounding the vehicle, it should be understood that in other embodiments, the cooling mediums may be provided to another load of the vehicle.

In an embodiment, the pressurization system 20 additionally includes a turbofan 90 including a turbine 92 operably coupled to a fan 94 by a shaft 96. As shown, the turbine 92 may be arranged downstream from and is in fluid communication with the first outlet 76 of the load heat exchanger 70 relative to a flow of compressed medium. The flow provided at the outlet of the turbine 92 may be further conditioned within a heat exchanger before being delivered to a load, such as the cabin for example.

During operation of the pressurization system 20 of FIG. 2, the medium A provided at the inlet 22 is provided generally directly and simultaneously to each of an inlet of the compressor 26a, the turbine 28a, and the compressor 26b. The medium A is compressed within the compressor 26a, and as a result, the compressed medium A1a output from the compressor 26a has an increased pressure and temperature relative to the medium A at the inlet 22. Within the turbine 28a, the medium A is expanded and work is extracted therefrom. The work extracted from the medium A within the turbine 28a in combination with the energy provided by the motor 36a is used to drive the compressor 26a. The expanded medium A2a output from the turbine 28a has a reduced temperature and pressure relative to the medium A provided to the inlet of the turbine 28a. Similarly, the compressed medium A1b output from the compressor 26b has an increased pressure and temperature relative to the medium A at the inlet 22.

The flow of first compressed medium A1a output from the compressor 26a is provided to the heated flow inlet 44 of the first cooling heat exchanger 38, and the flow of the second compressed medium A1b output from the compressor 26b is provided to the heated flow inlet 66 of the second cooling heat exchanger 60. Within each of the first cooling heat exchanger 38 and the second cooling heat exchanger 60, the respective compressed mediums A1a, A1b are cooled by the first cooling medium. In the illustrated, non-limiting embodiment, the first cooling medium is the expanded medium A2a output from the turbine 28a of the first cabin air compression device 24a. The first cooling medium A2a provided at the cooling flow outlet 62 of the second cooling heat exchanger 60 may be drawn through the fan 94 of the turbofan 90 and exhausted overboard. However, in other embodiments, the first cooling medium A2a provided at the cooling flow outlet 62 may be configured to bypass the fan 94 and is exhausted overboard.

The compressed medium A1a output from the first cooling heat exchanger 38 is configured to pass through a flow path extending between the first inlet 74 and the first outlet 76 of the first heat exchanger 70. At the same time, the compressed medium A1b output from the second cooling heat exchanger is configured to pass through a flow path extending between the first inlet 80 and the first outlet 82 of the second heat exchanger 72. Within the second heat exchanger 72, the compressed medium A1b is cooled by a second cooling medium, to be described in more detail below. From the first outlet 82 of the second heat exchanger 72, the further cooled compressed medium A1b is provided to the inlet of the turbine 28b of the second cabin air compression device 24b.

Within the turbine 28b, the compressed medium A1b is expanded and work is extracted therefrom. The work extracted from the medium A1b within the turbine 28b in combination with the energy provided by the motor 36b is used to drive the compressor 26b. The expanded medium A2b output from the turbine 28b has a reduced temperature and pressure relative to the second compressed medium A1b provided to the inlet of the turbine 28b.

The expanded medium A2b output from the turbine 28b is provided to the continuous fluid flow path extending between the second cooling medium inlet 78 of the first heat exchanger 70 and the second cooling medium outlet 84 of the second heat exchanger 72. Accordingly, in an embodiment, the expanded medium A2b is heated via the heat exchange relationship with the compressed medium A1a in the first heat exchanger 70 and the heat exchange relationship with the compressed medium A1b in the second heat exchanger 72. The resulting heated cooling medium A2b provided at the second outlet 82 may be exhausted overboard.

In an embodiment, the cooled compressed medium A1a provided at the first outlet 76 of the first heat exchanger 70 passes through a water collector 98 before being provided to the inlet of the turbine 92 of the turbofan 90. Within the turbine 92, the compressed medium A1a is expanded and work is extracted therefrom. The work extracted from the medium A1a is used to drive the fan 94 via the shaft 96. From the outlet of the turbine 92, the expanded medium A3 is provided to the cabin 100 or to one or more other loads. It should be understood that the configuration of the pressurization system 20 illustrated and described in FIG. 2 is intended as an example only and that any suitable configuration operable to condition one or more flows of medium therein is within the scope of the disclosure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pressurization system for a vehicle comprising:
   an inlet for receiving a medium;
   a cabin air compressing device arranged in fluid communication with the inlet, the cabin air compressing device comprising:
      a shaft;
      a compressor connected to the shaft, the compressor having a compressor inlet and a compressor outlet, the compressor inlet being fluidly connected to the inlet by a first conduit;
      an electric motor operably connected to the shaft and configured to drive the compressor; and
      a turbine connected to the shaft and also configured to drive the compressor upon receipt of the medium, the turbine having a turbine inlet and a turbine outlet, the turbine inlet being fluidly connected to the first conduit downstream from the inlet and upstream from the compressor inlet via a second conduit; and
   a heat exchanger having a first inlet fluidly connected to the compressor outlet and having a second inlet fluidly connected to the turbine outlet, the first inlet of the heat exchanger being directly connected to the compressor outlet;

a bypass conduit having an inlet end fluidly connected to the second conduit at a location upstream from the turbine and an outlet end fluidly connected to the second inlet of the heat exchanger, wherein only one or more of a flow of medium output from the turbine and a flow of medium from the bypass conduit is provided to the second inlet of the heat exchanger;

wherein the compressor inlet, the turbine inlet, and the bypass conduit are fluidly connected to and are arranged in parallel relative to the inlet.

2. The pressurization system of claim 1, wherein the medium is ram air.

3. The pressurization system of claim 1, wherein an expanded medium is provided at the turbine outlet and a compressed medium is provided at the compressor outlet, and within the heat exchanger, heat is configured to transfer from the compressed medium to the expanded medium.

4. The pressurization system of claim 3, wherein the compressed medium at an outlet of the heat exchanger is provided to at least one component configured to further condition the compressed medium.

5. The pressurization system of claim 4, wherein the at least one component configured to further condition the compressed medium further comprises a load heat exchanger.

6. The pressurization system of claim 3, wherein the expanded medium provided at an outlet of the heat exchanger is exhausted overboard.

7. The pressurization system of claim 6, wherein the expanded medium at the outlet of the heat exchanger is provided to another cooling heat exchanger.

8. The pressurization system of claim 1, further comprising:
a valve associated with the bypass conduit.

9. The pressurization system of claim 1, wherein the vehicle is an aircraft.

10. A method of conditioning a load of a vehicle comprising:
compressing a first portion of a medium provided from an inlet within a compressor to create a compressed medium that is output at a compressor outlet;
expanding a second portion of the medium provided from the inlet within a turbine to create an expanded medium, wherein compressing the first portion of the medium and expanding the second portion of the medium occur simultaneously;
providing the compressed medium from the compressor outlet directly to a cooling heat exchanger;
cooling the compressed medium within the cooling heat exchanger connected to the compressor outlet via a cooling medium;
operating a valve arranged within a bypass conduit such that at least some of the second portion of the medium provided from the inlet bypasses the turbine, wherein the cooling medium provided to the cooling heat exchanger is only one or more of the expanded medium and the at least some of the second portion of the medium that bypasses the turbine.

11. The method of claim 10, wherein the expanded medium output from the turbine is provided to the cooling heat exchanger as the cooling medium.

12. The method of claim 10, wherein in a first mode, the compressor is driven in response to expanding the second portion of the medium within the turbine, and in a second mode, the compressor is driven by an electric motor and in response to expanding the second portion of the medium within the turbine.

13. The method of claim 10, further comprising exhausting the cooling medium from the cooling heat exchanger overboard.

14. The method of claim 10, further comprising providing the cooling medium from the cooling heat exchanger to another cooling heat exchanger.

15. The method of claim 10, further comprising delivering the compressed medium provided at an outlet of the cooling heat exchanger to at least one component configured to further condition the compressed medium.

16. The method of claim 10, further comprising further cooling the expanded medium within a load heat exchanger via another cooling medium.

17. The method of claim 10, wherein the medium is ram air.

* * * * *